United States Patent
Schwab et al.

(10) Patent No.: US 12,390,859 B2
(45) Date of Patent: Aug. 19, 2025

(54) SYSTEM AND METHOD FOR REUSING POWDER IN ADDITIVE MANUFACTURING

(71) Applicant: General Electric Company, Schenectady, NY (US)

(72) Inventors: Lacey Lynn Schwab, Greenville, SC (US); Marina Yeon-Jeung Karr, Greenville, SC (US); Srikanth Chandrudu Kottilingam, Greenville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 371 days.

(21) Appl. No.: 17/985,094

(22) Filed: Nov. 10, 2022

(65) Prior Publication Data

US 2024/0157447 A1    May 16, 2024

(51) Int. Cl.
*B22F 10/80* (2021.01)
*B33Y 50/00* (2015.01)
*G05B 13/02* (2006.01)
*B22F 10/73* (2021.01)
*B33Y 40/00* (2020.01)

(52) U.S. Cl.
CPC ............. *B22F 10/80* (2021.01); *B33Y 50/00* (2014.12); *G05B 13/0265* (2013.01); *B22F 10/73* (2021.01); *B33Y 40/00* (2014.12)

(58) Field of Classification Search
CPC ......... B22F 10/80; B22F 10/73; B22F 10/28; B22F 10/85; B22F 12/90; B33Y 50/00; B33Y 40/00; B33Y 10/00; B33Y 30/00; B33Y 50/02; G05B 13/0265; B29C 64/153; B29C 64/357; B29C 64/393; Y02P 10/25

USPC ......................................................... 700/119
See application file for complete search history.

(56) References Cited

U.S. PATENT DOCUMENTS

| | | | |
|---|---|---|---|
| 11,701,711 B2 | 7/2023 | Muranaka | |
| 2018/0339466 A1 | 11/2018 | El Naga et al. | |
| 2019/0242865 A1* | 8/2019 | Bennett | G01N 33/20 |
| 2021/0031270 A1 | 2/2021 | Muranaka | |

FOREIGN PATENT DOCUMENTS

| | | |
|---|---|---|
| JP | 7165334 B2 | 8/2022 |
| KR | 101976670 B1 | 5/2019 |
| KR | 20200001600 A | 1/2020 |
| KR | 102428015 B1 | 8/2022 |
| WO | 2019187112 A1 | 4/2021 |

OTHER PUBLICATIONS

PCT International Search Report and Written Opinion; Application No. PCT/US2023/078641; dated Mar. 4, 2024; 11 pages.

* cited by examiner

*Primary Examiner* — Michael J Brown
(74) *Attorney, Agent, or Firm* — Fletcher Yoder, P.C.

(57) ABSTRACT

A system includes a powder reuse system (PRS) executable via a processor and configured to receive one or more inputs for a build of a first machine component in a sintering system. The PRS is further configured to retrieve a model configured to model a reuse of a sintering powder, and to derive a time during which a surplus unsintered powder left after printing the machine component via the sintering system using the sintering powder may be reused to build a second machine component by applying the one or more inputs to the model.

20 Claims, 3 Drawing Sheets

SYSTEM AND METHOD FOR REUSING POWDER IN ADDITIVE MANUFACTURING

BACKGROUND

The subject matter disclosed herein relates generally to systems incorporating a reuse of powder in additive manufacturing and methods for reusing powder in additive manufacturing.

A variety of machine components (e.g., turbomachine components) are exposed to fluid flows with high pressures and/or high temperatures. For example, the turbomachine components may include gas turbine engine components, such as compressor, combustor, and/or turbine components. The gas turbine engine components may include fuel nozzles, compressor blades, turbine blades, compressor wheels, turbine wheels, shroud segments, and combustor-to-turbine transition pieces, among others. These machine components may be manufactured using additive techniques, such as powder bed fusion techniques. For example, the machine components may be manufactured by adding a powder which may then be melted sequentially in layers to define the desired three-dimensional (3D) part. As discussed in detail below, it may be useful to reuse the powder applied in additive manufacturing.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a powder reuse system (PRS) executable via a processor and configured to receive one or more inputs for a build of a first machine component in a sintering system. The PRS is further configured to retrieve a model configured to model a reuse of a sintering powder, and to derive a time during which a surplus unsintered powder left after printing the machine component via the sintering system using the sintering powder may be reused to build a second machine component by applying the one or more inputs to the model.

In a second embodiment, a method of manufacturing a machine component includes receiving, via a powder reuse system (PRS), one or more inputs for a build of a first machine component in a sintering system, and retrieving, via the PRS, a model configured to model a reuse of a sintering powder. The method further includes deriving, via the PRS, a time during which a surplus unsintered powder left after printing the machine component via the sintering system using the sintering powder may be reused to build a second machine component by applying the one or more inputs to the model.

In a third embodiment, a non-transitory computer readable medium comprising instructions that when executed cause a processor to receive, via a powder reuse system (PRS), one or more inputs for a build of a first machine component in a sintering system. The instructions, when executed, further cause the processor to retrieve, via the PRS, a model configured to model a reuse of a sintering powder, and to derive, via the PRS, a time during which a surplus unsintered powder left after printing the machine component via the sintering system using the sintering powder may be reused to build a second machine component by applying the one or more inputs to the model.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
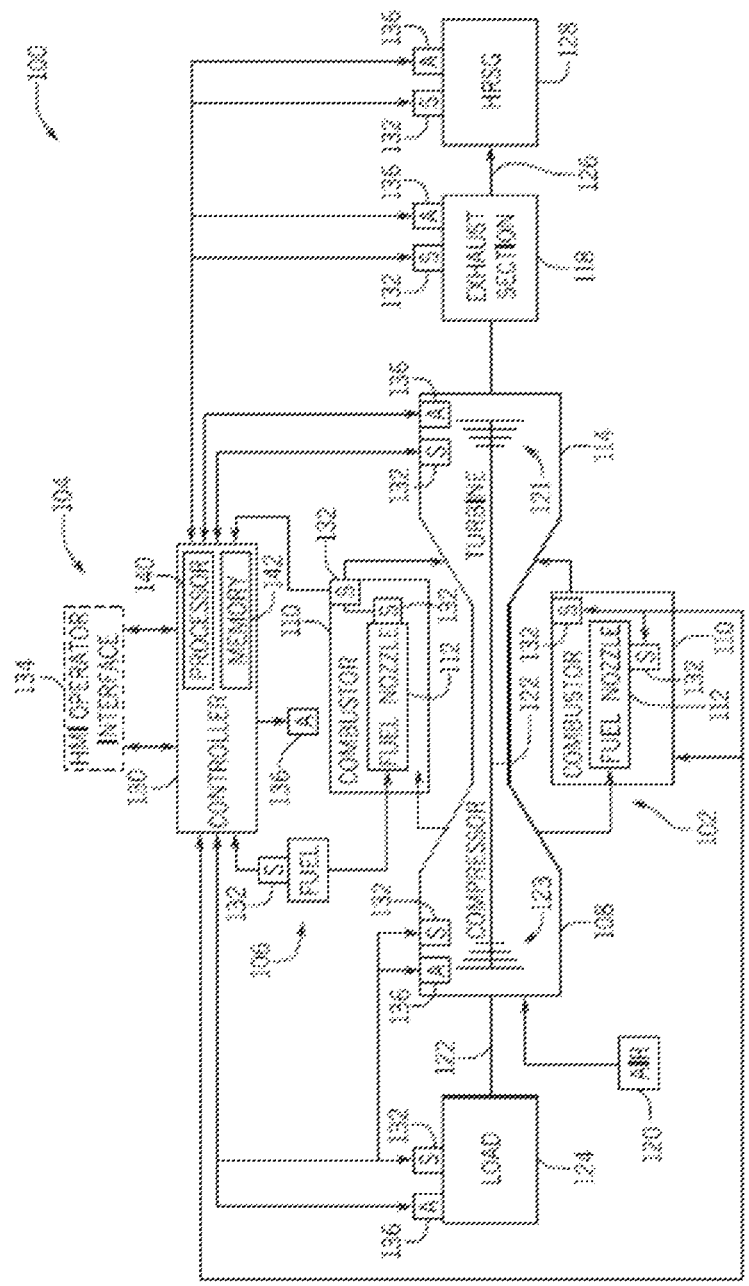
FIG. 1 is a block diagram of an embodiment of a turbomachine system including parts that may be sintered via a sintering system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, a layered structure (e.g., of a machine component) may be manufactured using additive methods that may include the use and reuse of certain powders. The powders may include metal powders, ceramic powders, ceramic metal (cermet) powders, polymer powders, or any combination thereof, depending on the particular additive methods and components being additively manufactured. For example, metals powders such as steel (e.g., stainless steel, titanium, nickel base alloys, aluminum, and so on, may be used via certain laser melting systems of additive manufacturing systems. The manufactured component may be all or part of a machine component, including machine components that may be subjected to thermal and mechanical stresses over extended periods of time. In some embodiments, such a machine component may be incorporated into a turbomachine, a rotary machine, a hot gas path machine, or some other machine. For example, the turbomachine may include a compressor, a pump, a turbine, or a combination thereof. The machine component may be a component of a turbine of the turbomachine, where the turbine may include a gas turbine, a steam turbine, a hydro turbine, and/or a wind turbine. The layered structure may be all or part of a turbomachine component, for example, a blade (e.g., a rotary blade or stationary vane), a turbine nozzle, a turbine frame, seal, a combustor liner, a combustor cap, a fuel nozzle, a compressor blade, a compressor wheel, a turbine wheel, a shroud segment, a gas pre-mixer, a liquid fuel injector, or a combustor-to-turbine transition piece.

In particular, in embodiments of the present disclosure, a sintering system of an additive manufacturing system may include certain techniques that reuse powder. The term "sintering", in accordance with the present disclosure, is included to refer to certain manufacturing techniques used to achieve a coalesced layer, where "coalesced layer" refers to a layer that has been densified from, for example, the powder. In other words, sintering may be a manufacturing process that coalesces the powder into a sintered, or coalesced, layer (e.g., by Direct Metal Laser Sintering (DMLS), Direct Metal Laser Melting (DMLM), Selective Laser Sintering (SLS), Electron Beam Melting (EBM), or any other appropriate additive manufacturing process). The powder may include a metal capable of being sintered by one of the aforementioned processes. By reusing powder to form the component, the component may be manufactured without disposing powder that may otherwise be still useful.

The powder reuse may be associated with leftover powder from additively manufacturing a component. For example, if the powder is drawn from a powder storage container or vessel for use in the additive manufacturing process, then any of the powder that remains in the powder storage container and/or is drawn from the powder storage container and potentially exposed to aspects of the additive manufacturing process could be reused in a future additive manufacturing process. The disclosed embodiments enable more efficient reuse of the powder from a previous additive manufacturing process.

In certain embodiments, a system and method for reusing the powder may include a powder characterization, a powder modeling, a test of one or more builds using the powder for additive manufacturing, and a powder reuse determination. The powder characterization may include characterizing the original powder (e.g., a virgin powder lot) based on various aspects discussed below. The powder modeling may include computer modeling to determine a time when the powder is expected to perform inadequately for additive manufacturing (e.g., a future time when the powder is expected to be unsuitable for additive manufacturing). The powder modeling may include a variety of computer models, such as use-based models, chemical-based models, or any combination thereof, as discussed below. The time determined by the powder modeling may include a duration of time (e.g., minutes, hours, days, weeks, months, years) of use of the powder during additive manufacturing processes and/or a future time independent from the duration of time. The time determined by the powder modeling also may include a total number of additive manufacturing processes and/or additively manufactured parts made using the powder. The time determined by the powder modeling also may include a total time of various types of exposure of the powder, such as a duration of time of exposure to certain temperatures (e.g., temperatures above one or more threshold temperatures), a duration of time of exposure to splatter associated with additive manufacturing, a duration of time of exposure to environmental conditions (e.g., ambient air, humidity, heat, etc.), or any combination thereof. The test may include one or more tests of the components made using the powder at the time determined by the powder modeling. If all tests pass, then the system and method may determine that the powder may be used for an infinite number of times and/or a future test may be optionally scheduled for another future time. If one or more tests fail, then the system and method may determine that the powder has a reuse limit and/or the powder needs extended testing. The tests may include dimension tests, hardness tests, impact tests, fracture toughness tests, creep tests, fatigue tests, nondestructive tests (NDT), tensile tests, ductility tests, corrosion tests (e.g., salt spray test), oxidation tests, thermal tests, and/or another other materials or parts tests to validate satisfactory performance of the additively manufactured parts. Each of the foregoing aspects of the system and method for reusing the powder may be used in the techniques described in detail below with reference to FIGS. 1-3.

Turning now to the drawings and referring first to FIG. 1, a block diagram of an embodiment of a power production system 100 is illustrated. It should be noted that the present disclosure may relate to any machinery, and that the power production system 100 discussed herein does not limit the scope by which the present disclosure applies. Indeed, sintered machine parts may be additively manufactured via reused powder for any type of machinery and the power production system 100 is presented as an example only.

The power production system 100 includes a gas turbine system 102, a monitoring and control system 104, and a fuel supply system 106. The gas turbine system 102 may include a compressor 108, combustion systems 110, fuel nozzles 112, a gas turbine 114, and an exhaust section 118. During operation, the gas turbine system 102 may draw air 120 into the compressor 108, which may then compress the air 120 and move the air 120 to the combustion system 110 (e.g., which may include a number of combustors). In the combustion system 110, the fuel nozzle 112 (or a number of fuel nozzles 112) may inject fuel that mixes with the compressed air 120 to create, for example, an air-fuel mixture.

The air-fuel mixture may combust in the combustion system 110 to generate hot combustion gases, which flow downstream into the turbine 114 to drive one or more turbine stages. For example, the combustion gases may move through the turbine 114 to drive one or more stages of turbine blades 121, which may in turn drive rotation of a shaft system 122. The shaft system 122 may additionally be coupled to one or more compressor stages having compressor blades 123. The shaft 122 may additionally connect to a load 124, such as a generator that uses the torque of the shaft 122 to produce electricity. After passing through the turbine 114, the hot combustion gases may vent as exhaust gases 126 into the environment by way of the exhaust section 118. The exhaust gas 126 may include gases such as carbon dioxide ($CO_2$), carbon monoxide (CO), nitrogen oxides (NOx), and so forth. The exhaust section 118 may include one or more exhaust treatment systems configured to reduce undesirable exhaust emissions.

The exhaust gas 126 may include thermal energy, and the thermal energy may be recovered by a heat recovery steam generation (HRSG) 128. The HRSG 128 may include a plurality of heat exchangers, superheaters, economizers, and other equipment configured to extract the thermal energy and generate steam. In combined cycle systems, such as the power plant 100, hot exhaust 126 may flow from the gas turbine 114 and pass to the HRSG 128, where it may be used to generate steam at one or more temperatures and pressures (e.g., low-pressure steam, intermediate-pressure steam, and high-pressure steam). The steam produced by the HRSG 128 may then be passed through a steam turbine engine for further power generation. In addition, the produced steam may also be supplied to any other processes where steam may be used, such as to a gasifier used to gasify a feedstock to produce an untreated syngas. The gas turbine engine generation cycle is often referred to as the "topping cycle," whereas the steam turbine engine generation cycle is often referred to as the "bottoming cycle." Combining these two cycles may lead to greater efficiencies in both cycles. In particular, exhaust heat from the topping cycle may be captured and used to generate steam for use in the bottoming cycle.

In certain embodiments, the system 100 may also include a controller 130 (e.g., electronic and/or processor-based controller). The controller 130 may be communicatively coupled to a number of sensors 132, a human machine interface (HMI) operator interface 134, and one or more actuators 136 suitable for controlling components of the system 100. The actuators 136 may include valves, switches, positioners, pumps, and the like, suitable for controlling the various components of the system 100. The controller 130 may receive data from the sensors 132, and may be used to control the compressor 108, the combustors 110, the turbine 114, the exhaust section 118, the load 124, the HRSG 128, and so forth.

In certain embodiments, the HMI operator interface 134 may be executable by one or more computer systems of the system 100. A plant operator may interface with the industrial system 100 via the HMI operator interface 134. Accordingly, the HMI operator interface 134 may include various input and output devices (e.g., mouse, keyboard, monitor, touch screen, or other suitable input and/or output device) such that the plant operator may provide commands (e.g., control and/or operational commands) to the controller 130.

The controller 130 may include a processor(s) 140 (e.g., a microprocessor(s)) that may execute software programs to perform the disclosed techniques. Moreover, the processor 140 may include multiple microprocessors, one or more "general-purpose" microprocessors, one or more special-purpose microprocessors, and/or one or more application specific integrated circuits (ASICS), or some combination thereof. For example, the processor 140 may include one or more reduced instruction set (RISC) processors. The controller 130 may include a memory device 142 that may store information such as control software, look up tables, configuration data, etc. The memory device 142 may include a tangible, non-transitory, machine-readable medium, such as a volatile memory (e.g., a random access memory (RAM)) and/or a nonvolatile memory (e.g., a read-only memory (ROM), flash memory, a hard drive, or any other suitable optical, magnetic, or solid-state storage medium, or a combination thereof). As mentioned earlier, all systems, parts, components and so on, of the power production system 100 may have mechanical components or parts. The techniques described herein provide for sintering the mechanical components or parts by reusing powder, such as by using an additive manufacturing system or sintering system 200, shown in FIG. 2.

Figure 2:
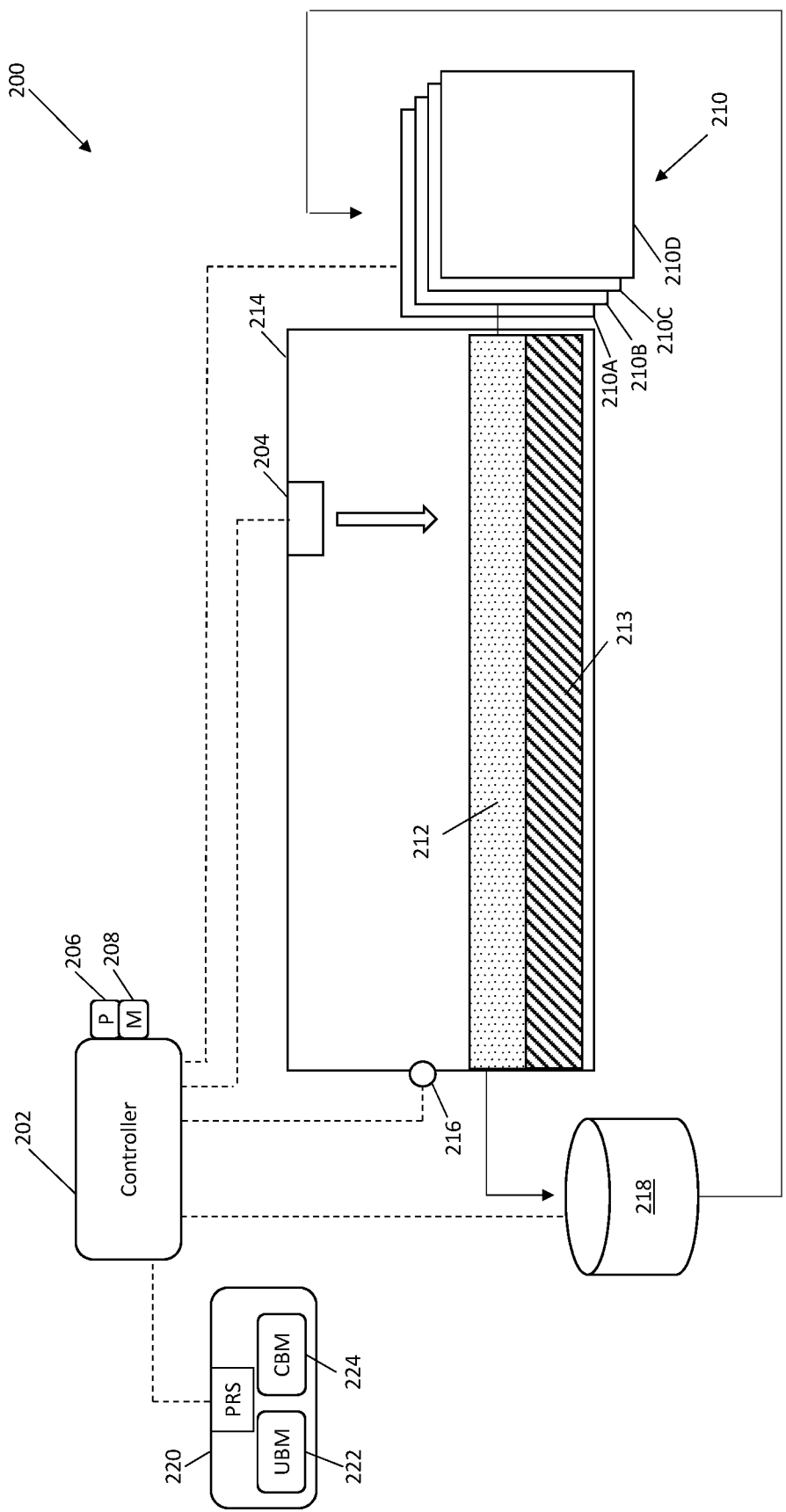
FIG. 2 is a block diagram of an embodiment of a sintering system that includes a powder reuse system.

FIG. 2 is a block diagram of an embodiment of the additive manufacturing system or sintering system 200 having a controller 202 (e.g., additive manufacturing controller or sintering controller) operatively coupled to an energy source 204 (e.g., laser source). In certain embodiments, the sintering system 200 may be programmed and/or configured as a powder reuse system (PRS) to reuse powder for additively manufacturing (e.g., sintering) various components. The controller 202 may include one or more processors 206 and a memory 208. The processor(s) 206 may execute computer instructions or code stored in the memory 208, such as code used to operate the energy source 204. The sintering system 200 also includes one or more powder source container 210 (e.g., 210A, 210B, 210C, and 210D) that may be used to provide a deposited powder 212 on top of a movable build plate 213 included in build chamber 214. As discussed below, the powder source containers 210A, 210B, 210C, and 210D may store or contain batches or volumes of a new virgin powder, a previously unused powder 212 having first conditions, a previously unused powder 212 having second conditions, and a mix or combination of new virgin powder and previously unused powder 212, respectively. The sintering system 200 may be configured to selectively use one or more of these powders in the powder source containers 210A, 210B, 210C, and 210D for additively manufacturing parts. Conveyance devices such as rollers, pumps, push actuators, and so on, may move and deposit powder onto the build plate 213 as deposited powder 212. The build plate 213 may move up and down (e.g., along the z axis) and sometimes along the x or y axes during printing.

After or as the powder is appropriately positioned as the deposited powder 212, the energy source 204 may be applied to the deposited powder 212 (e.g., via a laser). The energy source 204 may be directed for example, via computer numerical control (CNC), such as by reading a file stored in the memory 208 storing geometry data for a part to be manufactured. The geometry of a particular layer being sintered/coalesced may be defined by the areas in which the manufacturing system applies energy, while certain of the properties of the part may be determined by the amount of energy directed into particular areas of the powder 212. For example, in a general sense, a greater flux provided by a laser beam/electron beam, (e.g., more energy) may result in more sintering/coalescing of the powder, resulting in greater hardness, while less energy directed by the system may result in a more structurally flexible portion of the component.

The build chamber 214 may enclose a relatively inert environment (e.g., inert gas chamber, such as nitrogen chamber), aiding in the desired coalescing of the powder into a solid surface. One or more sensors 216 may be disposed in the build chamber 214 for example, to measure temperatures, to detect chemical levels (e.g., oxygen levels, nitrogen levels), to detect spatter (e.g., via optical sensors), to detect laser energy applied, measure humidity, and so on. As the energy source 204 defines a first solid layer, additional solid layers may be defined by adding additional powder 212 and/or lowering the first layer in the build chamber 214, until a complete part is 3D printed. It is to be understood that the depicted sintering system 200 may be a Direct Metal Laser Sintering (DMLS) system, a Direct Metal Laser Melting (DMLM) system, a Selective Laser Sintering (SLS) system, an Electron Beam Melting (EBM) system, or any other appropriate additive manufacturing process that uses powders.

Unused powder 212, e.g., an excess or surplus unsintered powder 212 left over in the build chamber 214 after a part has been manufactured, may have been typically disposed into a disposal container 218. The unused powder 212 is generally an excess or surplus portion of a powder batch or powder volume available for a sintering process; however, the unused powder 212 is not sintered as part of the sintering process. The unused powder 212 may be nevertheless exposed to various conditions, such as environmental conditions (e.g., ambient air, humidity, heat, etc.) and/or operational conditions (e.g., heat, splatter, etc.) associated with a sintering procedure. Before reusing the unused powder 212, the unused powder 212 may be processed to remove one or more impurities and/or contaminants, such as filtering to remove large particles, clumps, or splatter, moisture removal or dehydration to remove any undesirable moisture content, chemical treatment to remove any chemical impurities, or any combination thereof. The techniques describe herein may now enable reuse of the powder 212 in a more efficient and reliable manner. In the depicted embodiment, a powder reuse system (PRS) 220 may enable the reuse of powder that would have otherwise been disposed of after manufacturing the part. The PRS 220 may include one or more computer models, such as use-based model(s) 222 and/or chemistry-based model(s) 224. In one example of use, the PRS 220 may receive as input a "characterization" of unused or virgin powder. The characterization may include determining a powder material type (e.g., type of metal, ceramic, cermet, polymer, etc.), a chemical or material composition, material properties of the powder (e.g., hardness, corrosion resistance, oxidation resistance, wear resistance, coefficient of friction, thermal resistance, electrical conductivity, etc.), a grain size of the powder (e.g., an average or mean diameter of grains of the powder per measurements or manufacturing specifications), a grain size distribution (e.g., a normal distribution or bell curve of diameters of grains of the powder per measurements or manufacturing specifications), a uniformity of grains of the powder (e.g., uniformity in diameters, chemical or material composition, material properties, etc.), a date of manufacture of the powder, manufacturing specifications for the powder, measurement or test data for the powder, proportion of impurities in powder (e.g., percent of undesirable materials), and so on. Powder measurements and tests (e.g., mechanical tests, chemical tests, etc.) may also be used to help characterize the powder. The PRS 220 may be a stand-alone system communicatively coupled to the sensors 216 or may be part of the controller 202. The PRS 220 may be a software system or computer program, a hardware device, or a combination thereof.

Before or during additive manufacturing of the part, the models 222, 224 may be used to determine (e.g., derive, calculate, estimate, or predict) a remaining life for the powder, including reused powder that may be re-deposited into the build bed 213. The remaining life may correspond to a time when the powder (e.g., reused powder) is expected to no longer be suitable for use in additive manufacturing processes. The models 222, 224 may determine this time (e.g., remaining life) as a duration of time (e.g., minutes, hours, days, weeks, months, years) of use of the powder during additive manufacturing processes, a future time independent from the duration of time (e.g., a future date and time of day), a total number of additive manufacturing processes and/or additively manufactured parts made using the powder, or any combination thereof.

The use-based model(s) 222 may use as inputs a total powder used by the sintering system 200, a total powder used for printing upcoming parts, a height of the upcoming build(s), an environment of the powder (stored environment and/or build chamber 214 environment sensed via sensors 216), density of the build plate 213, powder reuse approach (e.g., new powder added from top, new powder added from bottom, new and reused powder blended together), or a combination thereof, to determine a remaining time and/or a remaining number of builds that the powder may be reused. In certain embodiments, the use-based model(s) 222 may be created using machine learning (ML) techniques.

For example, logged data for multiple parts builds using certain powders (e.g., characterized powders) may be collected, along with test done on the resulting parts. The tests may include x-rays, ultrasound, chemical tests, and so on, that detail how viable a built part was based on the powders (included reused powder, mixes of reused powders and new powders, and so on). That is, a test regime may be set to collect data based on first in last out (FILO) addition of new powder to reused powder, first in first out (FIFO) addition of new powder, or mixing new and reused powder, to determine how well certain parts print as the powder gets reused again and again. The results may be used to train a machine learning system, such as a system that uses neural networks, state vector machines, data miners, and so on. The trained system (e.g., PRS 220) may then be able to derive, for a given use case, how long the powder may be reused either by time until the powder may no longer be in the condition desired or by number of builds for certain parts that the powder may be used. Outputs may also include a risk associated with using the reused powder, or a time at which it may be desirable to test printed parts for viability to determine if the reused powder is still viable.

The chemistry-based model(s) 224 may use a chemistry-based approach or simulation in which chemical equations modeling the effects of oxygen, nitrogen, splatter, temperature, age, humidity, or a combination thereof, may be used with, time or build number as input. The chemistry-based model(s) 224 may then output a time at which the reuse powder is no longer viable, a risk (e.g., viability risk) associated with using the reused powder, or a time at which it may be desirable to test printed parts for viability. Accordingly, the powder 212 may be continuously reused, resulting in more efficient manufacturing that disposes of less (or in some cases, no powder).

The controller 202 and/or the PRS 220 is configured to use the time (e.g., remaining life for the powder) determined by the PRS 220 to schedule one or more tests of parts additively manufactured using the reused powder. At this determined time, the additively manufactured parts may undergo various tests to determine if the additively manufactured parts meet various testing criteria. If all tests pass, then the controller 202 and/or the PRS 220 may determine that the powder may be used for an infinite number of times and/or a future test may be optionally scheduled for another future time. If one or more tests fail, then the controller 202 and/or the PRS 220 may determine that the powder has a reuse limit and/or the powder needs extended testing. The tests may include dimension tests, hardness tests, impact tests, fracture toughness tests, creep tests, fatigue tests, nondestructive tests (NDT), tensile tests, ductility tests, corrosion tests (e.g., salt spray test), oxidation tests, thermal tests, and/or another other materials or parts tests to validate satisfactory performance of the additively manufactured parts. In certain embodiments, if all tests pass for the additively manufactured parts at the determined time (e.g., originally determined remaining life for the powder), then no further testing may be needed and the powder may continue to be reused in future additive manufacturing processes without any time limit. In certain embodiments, even if the foregoing technique may determine an infinite reuse of the powder, the controller 202 and/or the PRS 220 may optionally schedule one or more future tests to revalidate the powder for future reuses.

In certain embodiments, the sintering system 200 (e.g., PRS) is configured to use machine learning techniques to additively manufacture or build one or more machine components by selectively using a new virgin powder based on a first criteria, by selectively using the unused powder 212 (e.g., surplus unsintered powder) based on a second criteria, and by selectively using a combination or mix of the new virgin powder and the unused powder 212 based on a third criteria. The criteria may include important levels of various parts and areas of the parts, wherein the importance levels may include a scaled range from 1 to 5, 1 to 10, 1 to 100, or any suitable range. For higher numbers in the scaled range, the criteria may indicate a need for using the new virgin powder. For lower numbers in the scaled range, the criteria may indicate an acceptability to use the unused powder 212. For intermediate numbers in the scaled range, the criteria may indicate an acceptability to use a mixture or combination of the new virgin powder and the unused powder 212. The criteria also may include location criteria, such as a location exposed to a fluid flow path (e.g., exhaust gas flow path, combustion chamber area, compressed air flow path, etc.) or a location not exposed to a fluid flow path. The criteria also may include other operational parameters, such as expected thermal stress, expected exposure to corrosion, erosion, or other degradation, expected mechanical stress, or any combination thereof. Each of the foregoing criteria and other criteria may be used to identify parts and areas suitable for additive manufacturing with the new virgin powder, the unused powder 212, or a combination or mixture of the new virgin powder and the unused powder 21

In certain embodiments, the sintering system 200 may be configured to selectively use one or more of the new virgin powder from the powder source container 210A, the previously unused powder 212 having first conditions from the powder source container 210B, the previously unused powder 212 having second conditions from the powder source container 210C, and the mix of new virgin powder and previously unused powder 212 from the powder source container 210D for additively manufacturing parts. For example, the sintering system 200 may be programmed or configured to selectively use the new virgin powder from the powder source container 210A for additively manufacturing entire components and/or certain areas of components having relatively greater importance or critical functions, such as turbine blades and vanes, compressor blades and vanes, fuel nozzles, and/or surfaces exposed to fluid flow paths. By further example, the sintering system 200 may be programmed or configured to selectively use the unused powder 212 from the powder source container 210B and 210C for additively manufacturing entire components and/or certain areas of components having relatively lesser importance or non-critical functions, such seal supports, areas outside of the fluid flow paths, legs, feet, support structures of less importance, etc. For example, the unused powder 212 having first conditions may be of greater quality than the unused powder 212 having second conditions, and thus the quality level of the unused powder 212 also may be a basis for how and where to use the unused powder 212 for additively manufacturing parts. The first and second conditions may correspond to conditions determined by testing the unused powder 212, total number of sintering procedures performed with volumes of powder including the previously unused powder 212, total time of exposure of the powder including the previously unused powder 212 to environmental and/or operating conditions of sintering procedures, or any combination thereof. The sintering system 200 may be programmed or configured to use the lowest quality unused powder 212 for the least important or least critical parts or surfaces, and sintering system 200 may gradually use better quality unused powder 212 for more important parts or surfaces. If the unused powder 212 is not of sufficient quality alone, then the sintering system 200 may be programmed or configured to selectively use the mix of new virgin powder and previously unused powder 212 from the powder source container 210D for additively manufacturing entire components and/or certain areas of components having relatively intermediate importance, e.g., lesser importance that the parts and surfaces made with the new virgin powder and greater importance than the parts and surfaces made with the unused powder 212 alone. Thus, the sintering system 200 may be programmed or configured to use the powder based on various conditions and quality of the powder, based on various importance levels of the parts and/or surfaces being additively manufactured, based on user input, based on computer models, and based on machine learning (ML) techniques.

For example, computer models and/or machine learning techniques may determine when and where to use new virgin powder to improve the quality or integrity of the additively manufactured parts and surfaces, and when and where to use previously unused powder 212 and/or mixtures of new virgin powder and previously unused powder 212 to reduce powder waste and reduce manufacturing costs when appropriately for less important parts and surfaces. The computer models and/or machine learning techniques may use testing data and/or operational data associated with additively manufactured parts to help improve the selection and use of new virgin powder, unused powder 212, and mixtures thereof, for various parts and surfaces.

The computer models and/or machine learning techniques also may be configured to determine how to mix or generally combine new virgin powder with previously unused powder 212 to reduce powder waste, reduce manufacturing costs, and ensure usage of the previously unused powder 212 before the previously unused powder 212 is no longer viable for use in the sintering procedures. For example, for one or more sintering procedures, the computer models and/or machine learning techniques may position the new virgin powder at the bottom portion of the powder source container 210D while placing the previously unused powder 212 at the top portion of the powder source container 210D, such that the sintering procedure by the sintering system 200 uses all of the previously unused powder 212 prior to using the new virgin powder for manufacturing one or more parts or surfaces. By further example, for one or more sintering procedures, the computer models and/or machine learning techniques may position the previously unused powder 212 at the bottom of the powder source container 210D while placing the new virgin powder at the top portion of the powder source container 210D, such that the new virgin powder at the top provides some protection against additional exposure to the previously unused powder 212 prior to or during the sintering procedure by the sintering system 200.

Additionally, in certain embodiments, the computer models and/or machine learning techniques may be configured to improve operation of the sintering system 200, such that times and types of exposure to the unused powder 212 are substantially reduced or minimized to improve the quality and usefulness of the unused powder 212 for future sintering procedures. The exposure may include environmental exposure (e.g., exposure to ambient air, heat, humidity, etc.), operational exposure (e.g., operational heat, splatter, etc. during sintering procedures), or a combination thereof. For example, the sintering system 200 may control a laser to perform a sintering procedure in a manner that reduces thermal exposure or heat transfer to the unused powder 212, the sintering system 200 may control the sintering procedure to reduce splatter onto the unused powder 212, the sintering system 200 may reduce a total time for a sintering procedure to reduce various exposures to the unused powder 212, or any combination thereof. Additionally, the sintering system 200 may include one or more shields (e.g., thermal shields, splatter shields, environmental shields) to protect the unused powder 212 before, during, and after the sintering procedures. In some embodiments, the sintering system 200 may be configured to selectively move the one or more shields for better positioning to protect the unused powder 212 before, during, and after the sintering procedures.

Figure 3:
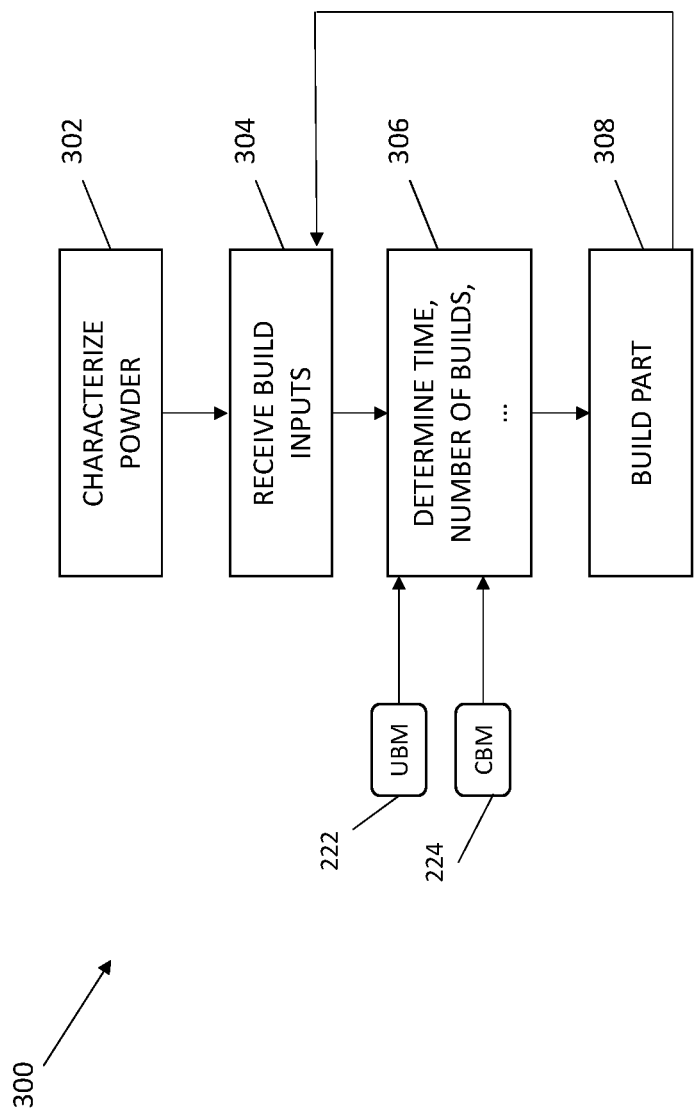
FIG. 3 is a flowchart of an embodiment of a process that may reuse sintering powder

FIG. 3 is a flowchart of an embodiment of a process 300 suitable for reuse of powder, such as the powder 212. The process 300 may be implemented as computer code or instructions stored, for example, in the memory 208 and executable by the processor(s) 206. In the depicted embodiment, the process 300 may first characterize (block 302) the powder to be used in sintering. As mentioned earlier, the characterization may include determining a powder type (e.g., metal powder, ceramic powder, cermet powder, polymer powder, etc.), a chemical composition, a grain size of the powder, measuring a mean or average uniformity of a grain of powder, determining a date of manufacture of the powder, and so on. Powder tests (e.g., mechanical tests, chemical tests) may also be used to characterize (block 302) the powder (e.g., new powder).

The process 300 may then receive (block 304) build inputs, such as upcoming builds and build files (e.g., geometry files used to create one or more parts for a given build), and thus the process 300 may know or approximate an amount of powder to be used, height(s) of the upcoming build(s), an environment of the powder (stored environment and/or build chamber 214 environment sensed via sensors 216), density of the build plate 213, powder reuse approach (e.g., new powder added from top, new powder added from bottom, new and reused powder blended together), and so on. The process 300 may then determine (block 306) certain modeled outputs, such as a remaining time that the powder may be reused, a remaining number of builds that the powder may be reused, a risk that the part is a viable part, a time to begin testing a part for viability, an estimated or predicted time to stop using the powder, or a combination thereof. When deriving the time to begin testing, the process 300 may derive, based on the outputs of the models 222, 224, how long of a time before the part may begin to no longer be viable and may thus benefit from testing the viability of the part.

The modeled outputs, such as, a remaining time that remaining powder may be used, a remaining number of builds that the powder may be reused, a risk associated with using the reused powder, a time at which it may be desirable to test the quality and/or condition of the powder (e.g., previously unused powder 212 being used for subsequent additive manufacturing of the parts) and/or a time at which it may be desirable to test printed parts for viability, or a combination thereof, may be derived by either or both of the models 222, 224. That is, data received from block 304 may be given to the models 222, 224 as inputs to derive (block 306) the remaining number of builds that the powder may be reused, the risk associated with using the reused powder, the time at which it may be desirable to test printed parts for viability, or the combination thereof.

The process 300 may then build (block 308) one or more parts. That is, the process 300 may 3D print another part or parts via the sintering system and while sensing data via the sensors 216. Indeed, in some embodiments, the process 300 may then iterate back to block 304, for example, to sense more data via sensors 216 or to receive other inputs for upcoming build(s), and the continue derivations with new inputs (or sensed data). Accordingly, the powder may be reused to minimize or in some cases to eliminate throwing away powder after a build.

In certain embodiments, the process 300 may characterize the powder material (block 302) and input the powder characterization into one or more models (e.g., use-based model, chemistry-based model, etc.) to generate a calculated build number and a future time for testing (block 306). As discussed above, the future time for testing may correspond to a remaining useful life for reuse of the powder, which may be based on calculations, estimations, predictions, etc. The process 300 may then perform the builds (block 308) according to the build number and the future time for testing. If the process 300 determines that some critical tests fail for the test builds, then the process 300 may determine that the powder has a use limit and needs extended testing. If the process 300 determines that all tests pass for the test builds, then the process 300 may determine that the powder can be used indefinitely.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Technical effects include deriving, via models such as use-base models and/or chemistry based models, a time by which a powder used by a sintering system may be reused. The powder may be characterized. The use-based model may take one or more inputs such as a first total sintering powder used by the sintering system to fill the sintering system, a second total sintering powder used for printing upcoming parts, a height of first machine component, an environment of the sintering powder, a density of a build plate included in the sintering system, a powder reuse approach comprising adding new powder from a top of the sintering system, adding new powder from a bottom of the sintering system, blending new virgin power and surplus unsintered powder, or a combination thereof. The chemistry based model(s) may take as input measurements taken from one or more sensors included in the sintering system.

The subject matter described in detail above may be defined by one or more clauses, as set forth below.

A system, comprising, a powder reuse system (PRS) executable via a processor and configured to: receive one or more inputs for a build of a first machine component in a sintering system; retrieve a model configured to model a reuse of a sintering powder; and derive a time during which a surplus unsintered powder left after printing the machine component via the sintering system using the sintering powder may be reused to build a second machine component by applying the one or more inputs to the model.

The system of any preceding clause, wherein the time includes at least one of a duration of time of use of the surplus unsintered powder during additive manufacturing processes, a future time independent from the duration of time, a total number of additive manufacturing processes and/or additively manufactured components made using the sintering powder and leaving behind the surplus unsintered powder, or a total time of various types of exposure of the surplus unsintered powder.

The system of any preceding clause, wherein the one or more inputs comprise a characterization of the sintering powder.

The system of any preceding clause, wherein the characterization comprises a metal type of the sintering powder, a chemical composition of the sintering powder, a grain size of the of the sintering powder, a uniformity of a grain of the sintering powder, a date of manufacture of the sintering powder, or a combination thereof.

The system of any preceding clause, wherein the model comprises a use-based model and wherein the one or more inputs comprise a first total sintering powder used by the sintering system to fill the sintering system, a second total sintering powder used for printing upcoming parts, a height of first machine component, an environment of the sintering powder, a density of a build plate included in the sintering system, a powder reuse approach comprising adding new powder from a top of the sintering system, adding new powder from a bottom of the sintering system, blending a new virgin powder and the surplus unsintered powder, or a combination thereof.

The system of any preceding clause, wherein the use-based model comprises a machine learning (ML) model trained by using test part data and sintering logs comprising the values for the one or more inputs acquired during printing of a plurality of test parts.

The system of any preceding clause, wherein the model comprises a chemistry-based model and wherein the one or more inputs comprise measurements taken from one or more sensors included in the sintering system.

The system of any preceding clause, wherein the measurements comprise an oxygen level, a nitrogen level, a splatter count, a temperature, a humidity, or a combination thereof.

The system of any preceding clause, wherein the PRS is configured to use machine learning techniques to build the second machine component by selectively using a new virgin powder based on a first criteria and by selectively using the surplus unsintered powder based on a second criteria.

The system of any preceding clause, wherein the PRS is configured to derive, via the model, a number of builds of one or more machine parts using the surplus unsintered powder in the sintering system, a viability risk of building the second machine part in the sintering system using the surplus unsintered powder, a test time to test the second machine part for viability, or a combination thereof.

The system of any preceding clause, wherein the PRS is configured to retrieve a second model configured to model the reuse of the sintering powder, and to derive the time via the model, the second model, or a combination thereof, and wherein the model comprises a use-based model and wherein the second model comprises a chemistry-based model.

A method of manufacturing a machine component, comprising receiving, via a powder reuse system (PRS), one or more inputs for a build of a first machine component in a sintering system; retrieving, via the PRS, a model configured to model a reuse of a sintering powder; and deriving, via the PRS, a time during which a surplus unsintered powder left after printing the machine component via the sintering system using the sintering powder may be reused to build a second machine component by applying the one or more inputs to the model.

The method of any preceding clause, wherein one or more inputs comprise a characterization of the sintering powder, and wherein the characterization comprises a metal type of the sintering powder, a chemical composition of the sintering powder, a grain size of the of the sintering powder, a uniformity of a grain of the sintering powder, a date of manufacture of the sintering powder, or a combination thereof.

The method of any preceding clause, wherein the model comprises a use-based model and wherein the one or more inputs comprise a first total sintering powder used by the sintering system to fill the sintering system, a second total sintering powder used for printing upcoming parts, a height of first machine component, an environment of the sintering powder, a density of a build plate included in the sintering system, a powder reuse approach comprising adding new powder from a top of the sintering system, adding new powder from a bottom of the sintering system, blending a new virgin powder and the surplus unsintered powder, or a combination thereof.

The method of any preceding clause, wherein the use-based model comprises a machine learning (ML) model trained by using test part data and sintering logs comprising the values for the one or more inputs acquired during printing of a plurality of test parts.

The method of any preceding clause, wherein the model comprises a chemistry-based model and wherein the one or more inputs comprise measurements taken from one or more sensors included in the sintering system.

The method of any preceding clause, comprising, deriving via the model, a number of builds of one or more machine parts using the surplus unsintered powder in the sintering system, a viability risk of building the second machine part in the sintering system using the surplus unsintered powder, a test time to test the second machine part for viability, or a combination thereof.

A non-transitory computer readable medium comprising instructions that when executed cause a processor to receive, via a powder reuse system (PRS), one or more inputs for a build of a first machine component in a sintering system; retrieve, via the PRS, a model configured to model a reuse of a sintering powder; and derive, via the PRS, a time during which a surplus unsintered powder left after printing the machine component via the sintering system using the sintering powder may be reused to build a second machine component by applying the one or more inputs to the model.

The computer readable medium of any preceding clause, wherein one or more inputs comprise a characterization of the sintering powder, and wherein the characterization comprises a metal type of the sintering powder, a chemical composition of the sintering powder, a grain size of the of the sintering powder, a uniformity of a grain of the sintering powder, a date of manufacture of the sintering powder, or a combination thereof.

The computer readable medium of any preceding clause, wherein the model comprises a use-based model and wherein the one or more inputs comprise a first total sintering powder used by the sintering system to fill the sintering system, a second total sintering powder used for printing upcoming parts, a height of first machine component, an environment of the sintering powder, a density of a build plate included in the sintering system, a powder reuse approach comprising adding new powder from a top of the sintering system, adding new powder from a bottom of the sintering system, blending a new virgin powder and the surplus unsintered powder, or a combination thereof.

The computer readable medium of any preceding clause, wherein the model comprises a chemistry-based model and wherein the one or more inputs comprise measurements taken from one or more sensors included in the sintering system.

The computer readable medium of any preceding clause, comprising instructions that when executed cause the processor to derive via the model, a number of builds of one or more machine parts using the surplus unsintered powder in the sintering system, a viability risk of building the second machine part in the sintering system using the surplus unsintered powder, a test time to test the second machine part for viability, or a combination thereof.

The invention claimed is:

1. A system, comprising,
a powder reuse system (PRS) executable via a processor and configured to:
receive one or more inputs for a build of a first machine component in a sintering system;
retrieve a model configured to model a reuse of a sintering powder;
derive a time for the reuse of a surplus unsintered powder by applying the one or more inputs to the model, wherein the surplus unsintered powder is left after printing the first machine component via the sintering system using the sintering powder, the reuse includes at least a build of a second machine component, and the time comprises a remaining life of the surplus unsintered powder; and
schedule a test of viability of manufacturing using the surplus unsintered powder based on the remaining life.

2. The system of claim 1, wherein the PRS is configured to:
analyze results of the test of the viability of manufacturing;
determine that the reuse of the surplus unsintered powder is infinite if the test passes; and
determine that the reuse of the surplus unsintered powder has a reuse limit if the test fails.

3. The system of claim 2, wherein the PRS is configured to determine that no further tests are required for the reuse of the surplus unsintered powder if the test passes.

4. The system of claim 1, wherein the one or more inputs comprise a characterization of the sintering powder, wherein the characterization comprises a metal type of the sintering powder, a chemical composition of the sintering powder, a grain size of the of the sintering powder, a uniformity of a grain of the sintering powder, and a date of manufacture of the sintering powder.

5. The system of claim 1, wherein the model comprises a use-based model and wherein the one or more inputs comprise:
a first total sintering powder used by the sintering system to fill the sintering system, a second total sintering powder used for printing upcoming parts, a height of first machine component, an environment of the sintering powder, a density of a build plate included in the sintering system, or a combination thereof; and
a plurality of powder reuse approaches including a first powder reuse approach comprising adding new powder from a top of the sintering system, a second powder reuse approach comprising adding new powder from a bottom of the sintering system, and a third powder reuse approach comprising blending a new virgin powder and the surplus unsintered powder.

6. The system of claim 1, wherein the model comprises a machine learning (ML) model trained by using test part data and sintering logs comprising the values for the one or more inputs acquired during printing of a plurality of test parts.

7. The system of claim 1, wherein the model comprises a chemistry-based model and wherein the one or more inputs comprise measurements taken from one or more sensors included in the sintering system, wherein the measurements comprise an oxygen level, a nitrogen level, a splatter count, a temperature, and a humidity.

8. The system of claim 1, wherein the PRS is configured to use machine learning techniques to build the second machine component by selectively using a new virgin powder based on a first criteria, by selectively using the surplus unsintered powder based on a second criteria, and by selectively using a combination or mixture of the new virgin powder and the surplus unsintered powder based on a third criteria, wherein the first, second, and third criteria comprise different importance criteria, different location criteria, different operational criteria, or any combination thereof, wherein the different operational criteria comprise thermal stress, corrosion, erosion, degradation, mechanical stress, or any combination thereof.

9. The system of claim 1, wherein the PRS is configured to retrieve a second model configured to model the reuse of the sintering powder, and to derive the time via the model, the second model, or a combination thereof, and wherein the model comprises a use-based model and wherein the second model comprises a chemistry-based model.

10. A method of manufacturing a machine component, comprising:
receiving, via a powder reuse system (PRS), one or more inputs for a build of a first machine component in a sintering system;
retrieving, via the PRS, a model configured to model a reuse of a sintering powder;
deriving, via the PRS, a time for the reuse of a surplus unsintered powder by applying the one or more inputs to the model, wherein the surplus unsintered powder is left after printing the first machine component via the sintering system using the sintering powder, the reuse includes at least a build of a second machine component, and the time comprises a remaining life of the surplus unsintered powder; and
scheduling a test of viability of manufacturing using the surplus unsintered powder based on the remaining life.

11. The method of claim 10, wherein one or more inputs comprise a characterization of the sintering powder, and wherein the characterization comprises a metal type of the sintering powder, a chemical composition of the sintering powder, a grain size of the of the sintering powder, a uniformity of a grain of the sintering powder, a date of manufacture of the sintering powder, or a combination thereof.

12. The method of claim 10, wherein the model comprises a use-based model and wherein the one or more inputs comprise a plurality of powder reuse approaches including a first powder reuse approach comprising adding new powder from a top of the sintering system, a second powder reuse approach comprising adding new powder from a bottom of the sintering system, and a third powder reuse approach comprising blending a new virgin powder and the surplus unsintered powder.

13. The method of claim 10, comprising:
analyzing results of the test of the viability of manufacturing;
determining that the reuse of the surplus unsintered powder is infinite if the test passes; and determining that the reuse of the surplus unsintered powder has a reuse limit if the test fails.

14. The method of claim 13, comprising determining that no further tests are required for the reuse of the surplus unsintered powder if the test passes.

15. The method of claim 14, comprising performing the test of the viability of manufacturing at a scheduled time at least by testing one or more parts manufactured by the sintering system using the surplus unsintered powder.

16. A non-transitory computer readable medium comprising instructions that when executed cause a processor to:

receive, via a powder reuse system (PRS), one or more inputs for a build of a first machine component in a sintering system;

retrieve, via the PRS, a model configured to model a reuse of a sintering powder;

derive, via the PRS, a time for the reuse of a surplus unsintered powder by applying the one or more inputs to the model, wherein the surplus unsintered powder is left after printing the first machine component via the sintering system using the sintering powder, the reuse includes at least a build of a second machine component, and the time comprises a remaining life of the surplus unsintered powder; and schedule a test of viability of manufacturing using the surplus unsintered powder based on the remaining life.

17. The computer readable medium of claim 16, wherein one or more inputs comprise a characterization of the sintering powder, and wherein the characterization comprises a metal type of the sintering powder, a chemical composition of the sintering powder, a grain size of the of the sintering powder, a uniformity of a grain of the sintering powder, a date of manufacture of the sintering powder, or a combination thereof.

18. The computer readable medium of claim 16, wherein the model comprises a use-based model and wherein the one or more inputs comprise a first total sintering powder used by the sintering system to fill the sintering system, a second total sintering powder used for printing upcoming parts, a height of first machine component, an environment of the sintering powder, a density of a build plate included in the sintering system, a powder reuse approach comprising adding new powder from a top of the sintering system, adding new powder from a bottom of the sintering system, blending a new virgin powder and the surplus unsintered powder, or a combination thereof.

19. The computer readable medium of claim 16, wherein the instructions, when executed cause the processor to:

analyze results of the test of the viability of manufacturing;

determine that the reuse of the surplus unsintered powder is infinite if the test passes; and determine that the reuse of the surplus unsintered powder has a reuse limit if the test fails.

20. The computer readable medium of claim 19, wherein the instructions, when executed cause the processor to:

determine that no further tests are required for the reuse of the surplus unsintered powder if the test passes.

* * * * *